United States Patent [19]

Bocquet et al.

[11] Patent Number: 4,857,128
[45] Date of Patent: Aug. 15, 1989

[54] METHOD FOR MAKING REINFORCING ASSEMBLIES COMPRISING REINFORCEMENT THREADS AND A MATRIX

[75] Inventors: Jean-Louis Bocquet, Artonne; Jacques Gouttebessis, Chanat-la-Mouteyre; Maurice Rey, La Raye-Dieu, all of France

[73] Assignee: Compangnie Generale des Etablissements Michelin-Michelin et Cie, Clermont-Ferrand Cedex, France

[21] Appl. No.: 161,901

[22] Filed: Feb. 29, 1988

Related U.S. Application Data

[62] Division of Ser. No. 817,906, Jan. 10, 1986, Pat. No. 4,754,794.

[30] Foreign Application Priority Data

Jan. 18, 1985 [FR] France ................................ 85 00875

[51] Int. Cl.⁴ ............................................. B32B 31/00
[52] U.S. Cl. ................................ 156/244.12; 156/136; 156/296; 264/174
[58] Field of Search ............... 152/451, 527, 542, 547, 152/540; 245/1.5; 57/223, 237, 902; 427/412, 409, 407.3; 428/295, 383, 378, 296; 156/136, 145, 123, 48, 244.12, 296, 308.2; 264/174, 261

[56] References Cited

U.S. PATENT DOCUMENTS

| | | | |
|---|---|---|---|
| 1,914,040 | 6/1933 | Pierce | 156/136 X |
| 1,943,273 | 1/1934 | Lerch | 156/136 X |
| 2,471,752 | 5/1949 | Ingmanson | 156/244.12 X |
| 2,669,754 | 2/1954 | Chadbourne | 264/174 |
| 2,778,764 | 1/1957 | Morrison | 156/296 X |
| 2,827,099 | 3/1958 | Youngs | 152/451 |
| 2,979,431 | 4/1961 | Perrault | 156/244.12 |
| 3,372,894 | 3/1968 | Pearce | 245/1.5 |
| 3,378,056 | 4/1968 | Robertson | 152/451 |
| 3,645,819 | 2/1972 | Fujii et al. | 156/296 X |
| 4,169,186 | 9/1979 | Tazaki et al. | 428/378 X |
| 4,176,705 | 12/1979 | Russell et al. | 152/451 X |

FOREIGN PATENT DOCUMENTS

| | | |
|---|---|---|
| 1495866 | 9/1967 | France . |
| 1157913 | 7/1969 | United Kingdom . |
| 1163108 | 9/1969 | United Kingdom . |

OTHER PUBLICATIONS

Patents Abstracts of Japan, vol. 7, No. 265 (M-258) [1410], Nov. 25, 1983, Japanese Appln. No. 58-145509, Tokusen, Kogyo K.K.
NASA Tech. Brief, Langley Research Center, Hampton, VA, "Solventless Fabrication of Reinforced Composites", Jul. 5, 1983.

*Primary Examiner*—Raymond Hoch
*Attorney, Agent, or Firm*—Brumbaugh, Graves, Donohue & Raymond

[57] ABSTRACT

A method of obtaining a reinforcing assembly comprising reinforcement threads and a solid matrix is characterized by the fact that reinforcement threads surrounded individually by a sheathing of organic material I and furthermore surrounded by another sheathing of organic material II are grouped together, by the fact that the material II is caused to migrate into voids between the threads sheathed with material I and by the fact that the material II is caused to solidify.

12 Claims, 4 Drawing Sheets

METHOD FOR MAKING REINFORCING ASSEMBLIES COMPRISING REINFORCEMENT THREADS AND A MATRIX

This application is a division of application Ser. No. 817,906, filed on Jan. 10, 1986, now U.S. Pat. No. 4,754,794.

The present invention concerns assemblies comprising threads and a matrix in which such threads are arranged, these assemblies being intended to reinforce articles, particularly articles of plastic material or materials or of rubber material or materials.

Such assemblies can, for instance, form cables, bead rings or plies intended to reinforce tubes, straps, conveyor belts or pneumatic tires. It is already known to produce these assemblies by arranging reinforcing threads or assemblies of reinforcing threads within a matrix of plastic or rubber. Such methods are described, for instance, in the following patents:

French Pat. No. 731,314, British Pat. No. 424,526, British Pat. No. 802,253, U.S. Pat. No. 3,522,139. These known methods have the following drawbacks:

either they require the use of costly and unreliable means for maintaining a fixed predetermined distance between the treads or thread assemblies within the matrix, for instance fabrics or clips;

or they do not permit the maintaining of this distance, which causes, on the one hand, a variation in the geometrical shape of these assemblies and hence in non-uniform performance and, on the other hand, wear of the threads or assemblies of threads between themselves as a result of rubbing between the threads or assemblies of threads within the matrix and therefore damage to the articles which they reinforce.

The object of the present invention is to eliminate these drawbacks. Therefore, the method of the present invention of obtaining an assembly intended to reinforce an article, the assembly having reinforcement threads and a solid matrix in which these threads are arranged, is characterized by the following features:

(a) reinforcement threads surrounded individually by a sheathing of organic material I and furthermore surrounded by another sheathing of organic material II are grouped together;

(b) material II is caused to migrate into voids between the threads sheathed with material I so as to fill the voids with the material II which is then in liquid or pasty state, the threads sheathed with material I being grouped in such a manner that the sheathings of material I of two adjacent reinforcement threads are in contact with each other at the end of the migration of material II;

(c) the material II is caused to solidify, it thus constituting the solid matrix in which the threads sheathed with material I are arranged;

(d) during the migration and the solidification of the material II, the threads and their sheathings of material I remain solid; and (e) the material I adheres to the threads which it surrounds and to the matrix with which it is in contact.

The present invention also covers the assemblies obtained by this method.

The present invention also concerns an assembly intended to reinforce an article, the assembly, which comprises reinforcement threads and a solid matrix in which these threads are arranged, being characterized by the following features:

(a) each of these threads is surrounded individually with a solid sheathing of organic material I;

(b) these threads thus sheathed with material I are arranged in the solid matrix;

(c) the solid matrix is an organic material obtained from a liquid or pasty organic material II which can solidify at a temperature at which the sheathing of material I and the reinforcement threads remain solid;

(d) the matrix fills voids between the threads sheathed with material I, these threads being grouped in such a manner that the sheathings of material I of two adjacent reinforcement threads are in contact with each other; and (e) the material I adheres to the threads which it surrounds and to the matrix with which it is in contact.

The present invention also concerns complex reinforcing assemblies each of which comprises a plurality of assemblies in accordance with the present invention, as well as the methods of producing these complex assemblies.

The present invention also concerns articles comprising assemblies or complex assemblies in accordance with the invention.

By the expression "assembly having reinforcement threads", there is understood an assembly comprising independent reinforcement threads, for instance a bundle of reinforcement threads and/or at least one winding of turns of a reinforcement thread, each winding turn being then assimilated to a reinforcement thread.

The present invention will be easily understood from the non-limitative examples which follow and the entirely schematic figures referring to said examples.

Figure 1:
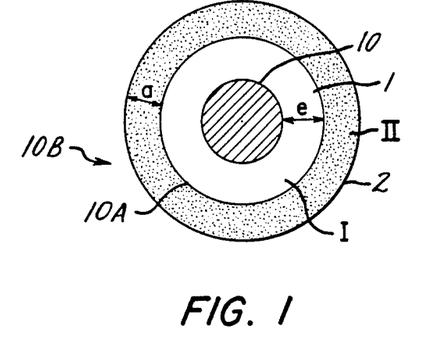
FIG. 1 shows in cross section a thread surrounded by a sheathing of organic material I and a sheathing of organic material II.
Figure 2:
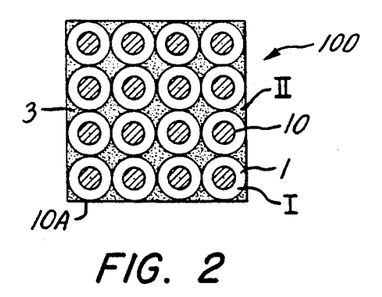
FIG. 2 shows in cross section an assembly in accordance with the invention.

FIG. 1 shows a reinforcement thread 10 used to produce the assembly 100 shown in FIG. 2, FIGS. 1 and 2 being sections taken perpendicular to the axes of the threads 10 which are arranged parallel to each other in the assembly 100.

This thread 10 is surrounded by a sheathing 1 produced of an organic material I, this sheathing 1 being directly in contact with the thread 10, and by a sheathing 2 of organic material II, this sheathing 2 being directly in contact with the the sheathing 1. The materials I and II are, for instance, thermoplastic materials such that the melting point of material I is higher than the melting point of material II.

For clarity in description, various superscripts and designations are used in connection with the thread 10, in the following manner:

the thread itself is marked 10;

the combination of the thread 10 and its solid sheathing 1 is called the "sheathed thread 10A";

the combination of the thread 10 and its solid sheathings 1, 2 is called the "sheathed thread 10B" (FIG. 1);

the combination of the thread 10, its solid sheathing 1 and a sheathing of liquid or pasty material II, for instance after the melting of the sheathing 2, is called "the sheathed thread 10C."

The sheathings 1 and 2 are produced, for instance, by means of two successive extrusions around the thread 10, the first extrusion forming the sheathing 1 and therefore the sheathed thread 10A and the second extrusion producing the sheathing 2 and therefore the sheathed thread 10B when the sheath 2 is solid, the material of the thread 10 remaining solid when the materials I or II are in molten state.

These two extrusions can be effected batchwise, for instance with two separate apparatus, or else continuously, in particular with a single apparatus having an extrusion head with two separate feeds for the materials I and II. In all cases, the extrusion of the sheathing 2 over the sheathing 1 must be effected when the material I is solid, that is to say the sheathing 2 must be extruded over the sheathed thread 10A.

The assembly 100 comprises a plurality of threads 10A, that is to say a plurality of threads 10 each enclosed individually in a sheathing 1, and a solid matrix 3 in which the sheathed threads 10A are arranged. This matrix 3 is formed by the material II of the sheathings 2 which have been previously described.

The assembly 100 is produced, for instance, in the following manner: The material II of the sheathing 2 is melted while the sheathing 1 is maintained in solid state so as to obtain the sheathed thread 10C. This operation can be carried out, for instance, by passing the sheathed thread 10B into a furnace or tunnel which is heated in such a manner that the temperature reached by the material II is greater than the melting point of the material II but less than the melting point of material I. The heating can be effected by any known means, for instance by infrared rays. Several threads 10C, each formed by a thread 10 surrounded by the solid sheathing 1 and the molten material II, are then grouped by placing them against each other and the migration produced of the molten material II into the voids between the sheathed threads 10A in such a manner as to fill the voids with the liquid or pasty material II while the material I remains solid during this migration. This migration is obtained, for instance, by a pressure exerted on the threads 10C.

Cooling is then effected and the material II solidifies to form the matrix 3. One thus obtains the finished assembly 100. As a result of the method previously described, the threads 10 remain separate from each other since the solid sheathings 1 avoid any direct contact between the threads 10 during the production of the assembly 100. The sheathings 1 of two adjacent threads 10A are in contact with each other, that is to say the distance between two adjacent threads 10 is constant and equal to $2e$, e being the thickness of each solid sheathing 1, the sheathed threads 10A being thus in contact with each other. It is easy to select the thickness "e" (FIG. 1), that is to say the thickness of the sheathing 1, such as to assure a given distance $2e$ between two adjacent threads 10, and it is easy also to select the amount of material II for the sheathings 2 such that after fusion the material II fills the voids between the sheathed threads 10A, that is to say between the sheathings 1 which serve as a sort of wedge between the threads 10 upon the production of the assembly 100. In the finished assembly 100, the matrix 3 therefore fills all the spaces between the sheathed threads 10A. The amount of material II is determined by the thickness "a" of the sheathing 2 (FIG. 1), with due consideration of the diameter of the sheathed thread 10A.

The method of the invention makes it possible to obtain in simple and economic manner, a given geometrical shape for the assembly 100, with a constant distance between the threads 10 which are without direct contact with each other due to the sheathings 1. In this way, uniform performance is obtained for this assembly 100, avoiding the risk of wear of the threads against each other.

The threads 10 may be made of a metal material such as steel or of a non-metallic material, for example an inorganic material such as glass, or an organic material such as a polyester, a non-aromatic polyamide or an aromatic polyamide. The invention also makes it possible to avoid corrosion when the threads 10 consist of metal.

The organic materials I and II may be other than thermoplastic; thus, for example, at least one of these materials may be a vulcanizable or curable material, for instance a rubber or a curable resin, for instance a phenolic resin or an epoxy resin, the material II upon the production of the assembly 100 being in liquid or pasty state prior to vulcanization or curing so as to migrate between the sheathed threads 10A, and the vulcanization or curing of the material II being then caused, giving the solid matrix 3.

When it is in contact with the material II, the material I must remain solid, but it may, for instance, be a resin which was cured before the production of the assembly 100.

When the materials I and/or II are not thermoplastic, their chemical composition may vary between the time when the coating of the sheathings 1 and/or 2 is effected and the time when these sheathings are solid. In any event, at the time of the production of the assembly 100 the temperature at which the material II is when it is in liquid or pasty state must be such that the materials of the thread 10 and of the sheathing 1 remain solid and do not suffer any substantial deterioration, the material II being therefore able to solidify at a temperature at which the material I and the thread 10 remain solid.

It is preferable to use two thermoplastic materials I and II as previously described, since the manner of operation is very simple and permits rapid rates of manufacture for the production of the assembly 100.

The materials I and/or II may each comprise several organic materials, for instance a mixture of polymers, and they may contain inorganic materials, for instance fillers and various adjuvants.

It is furthermore possible to select the moduli of the threads 10 and materials I, II such as to permit a good distribution of the stresses in the assembly 100 upon its use.

Furthermore, in order to permit a good distribution of the stresses in the assembly 100, it is necessary that the material I adhere to the threads 10 and to the matrix 3.

Figure 3:
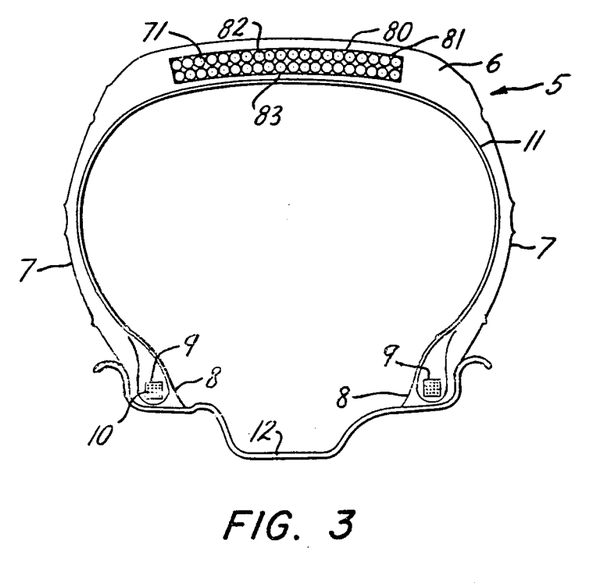
FIG. 3 shows in radial section a pneumatic tire having two bead rings, each of which is an assembly according to the invention.

FIG. 3 shows in radial section an article employing two assemblies according to the invention, this article being a pneumatic tire. This tire 5 has a crown 6, two sidewalls 7 and two beads 8. Each bead 8 is reinforced by a bead ring 9 which is formed by the assembly 100 according to the invention, shown in FIG. 2. In FIG. 3, for simplification of the drawing, each thread 10 together with its sheathing 1 is represented by a dot. A carcass 11 joins the bead rings 9 together, being wound around the bead rings in known manner. The tire 5 is mounted on the rim 12.

Preferably in each bead ring 9 the ratio between the extension modulus of each thread 10 and the compression modulus of the material I is at least equal to 1 and at most equal to 300, and the materials I and II preferably have substantially the same compression modulus in each ring 9. The moduli are determined at 20° C.

EXAMPLE 1

By way of example, each bead ring 9 has the following features:

threads 10: steel wires, these wires each having a modulus of extension of 20,000 daN/mm$^2$; diameter of each wire: 1 mm; number of wires in the bead ring: 16, the bead ring having a square cross section with four layers of four wires each (FIG. 2);

sheathing 1: thickness "e": 0.5 mm; material I: polyamide 66; melting point of material I: 255° C.; compression modulus of material I: 320 daN/mm$^2$; the wires 10 are preheated before the production of the sheathing 1 in manner known per se in order to cause good adherence between the wires 10 and the material I;

initial sheathing 2, before the production of the matrix 3: thickness "a" in solid state: 0.13 mm; material II: polyamide 6; melting point of material II: 220° C.; compression modulus of material II: 290 daN/mm$^2$;

distance between adjacent wires 10: 1 mm (2e) in each layer and from one layer to the next;

materials I and II have good adherence to each other, since they are both polyamides.

The geometrical values and the moduli indicated above for the bead rings 9 are determined at 20° C.

The sheathings 1 and 2 around the wires 10 are produced by double extrusion, as described above.

Figure 4:
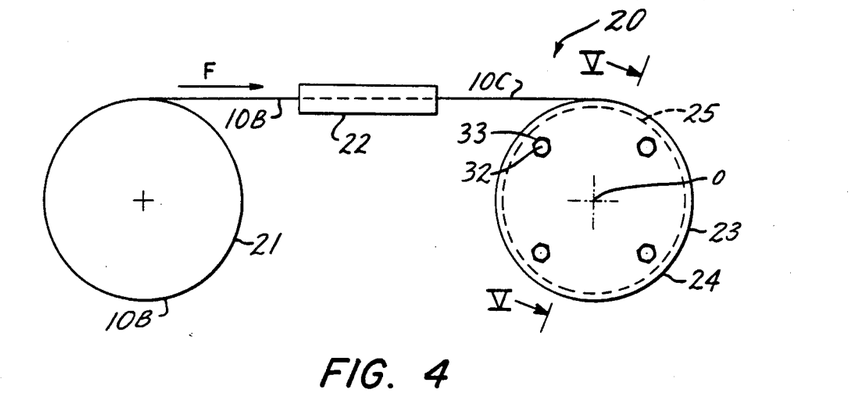
FIG. 4 shows, seen in side view, a device for producing the bead rings shown in FIG. 3, this device comprising a drum.

Each bead ring 9 is produced by a method which employs the apparatus 20 shown in FIG. 4. This apparatus 20 comprises a spool 21, a heating tunnel 22 and a drum 23. The sheathed wire 10B comprising the solid sheathings 1 and 2 is wound on the spool 21. This sheathed wire 10B is unwound in the direction indicated by the arrow F in order to cause it to pass through the tunnel 22 and wind it onto the drum 23. As previously described, the heating tunnel 22 permits the melting of the material II while the material I remains solid so as to obtain the sheathed wire 10C, which is then wound onto the drum 23.

Figure 5:
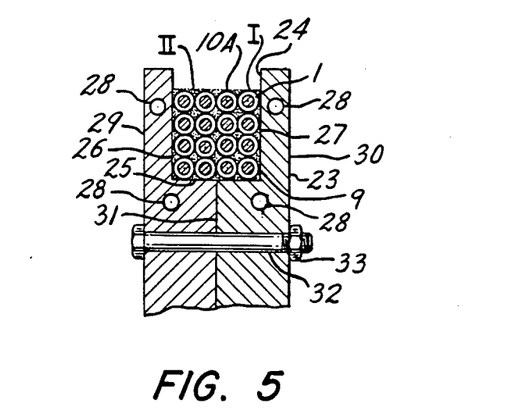
FIGS. 5 and 6 each show in cross section a portion of the drum shown in FIG. 4.

FIG. 5 shows a portion of the cross section of the drum 23 along a plane passing through the axis of rotation of the drum 23, the axis being schematically indicated by the letter 0 in FIG. 4, the cross section of FIG. 5 being indicated schematically by the straight line V—V in FIG. 4. The groove 24 has a longitudinal orientation on the drum 23 and its cross-section in FIG. 5 has a rectangular shape, this groove 24 having a cylindrical bottom 25 and two sidewalls 26, 27. The cylinder 25 has the same axis of rotation 0 as the drum 23 and the sidewalls 26, 27 are cylindrical crowns of axis of rotation 0 and flat shape, the planes of these crowns 26, 27 being perpendicular to the axis 0. The winding of the sheathed wire 10C is effected in the groove 24 in four superposed layers of four turns each. The pressure exerted on the assembly of these turns by the walls 25, 26, 27 during the winding permits the filling of the voids between the sheathed wires 10A by the liquid material II, the material I of the sheathing 1 remaining solid, and the groove 24 serving as mold due to its walls 25, 26, 27. The heating resistors 28 make it possible to maintain the material II at a temperature above the melting point of material II and below the melting point of material I. By way of example, the temperature of material II in the tunnel 22 and in the groove 24 is about 245° C. When 16 turns have been brought together by winding in the groove 24, the sheathed wire 10C is cut and the drum 23 is allowed to cool so as to cause the solidification of the material II and thus obtain the bead ring 9.

The drum 23 is formed of two parts 29, 30 the juncture plane 31 of which, perpendicular to the axis 0, extends to the cylindrical face 25. These parts are connected together by bolts 32 which pass through these parts, the clamping being effected by nuts 33 arranged on the ends of the bolts 32. When the material II has solidified, the drum 23 is taken apart by unscrewing the nuts 33 and removing the bolts 32, which makes it possible to separate the parts 29, 30 and to remove the bead ring 9 from the groove 24. The drum 23 can then be reassembled by placing the parts 29, 30 together for the production of another bead ring 9.

EXAMPLE 2

The following example permits a comparison of two series of pneumatic tires. The first series comprises six tires whose bead rings are not in accordance with the present invention and the second series comprises six tires whose bead rings are in accordance with the present invention, each tire having two bead rings.

All the tires are radial tires of size 175×14, the tires of the first series differing from the tires of the second series only by the bead rings.

Each bead ring not in accordance with present invention is produced by using a steel wire of a diameter of 1 mm, this being surrounded by a single sheathing of polyamide 6, the thickness of this sheathing in solid state being 0.1 mm. This wire is used in the apparatus 20 previously described in such a manner as to melt the sheathing and wind 18 turns of the wire in the groove 24. The melted polyamide 6 then forms a matrix in which the 18 turns of the steel wire, which then does not have an individual sheathing, are arranged, the assembly of the matrix and turns constituting a bead ring.

Each bead ring in accordance with the present invention is made by using the sheathed wire 10B previously described, having the following characteristics:

wire 10: identical to the steel wire used to make the bead rings not in accordance with the invention;

sheathing 1: thickness "e": 0.025 mm; material I: polyamide 66;

sheathing 2: thickness "a": 0.075 mm; material II: polyamide 6 identical to the polyamide 6 used for the bead rings not in accordance with the invention.

The thicknesses "e" and "a" are determined for solid sheathings 1 and 2.

The materials I and II have the same characteristics as previously described in Example 1, namely:

Material I (polyamide 66): melting point: 255° C.; compression modulus: 320 daN/mm²;

Material II (polyamide 6): melting point: 220° C.; compression modulus: 290 daN/mm²;

The geometrical values and the moduli given previously for these bead rings are determined at 20° C. Each bead ring according to the present invention is made in the manner previously described by the method of the present invention in the apparatus 20 by winding 18 turns, as in the case of the bead rings not in accordance with the invention.

All the bead rings have the same outside geometrical dimensions and each of them comprises a stack of five layers of wires, the layers of orders one, three and five each having four turns and the layers of orders two and four each having three turns, the order of the layers corresponding to the order of the stacking.

Each tire is subjected to the same test, which consists in mounting the tire on its rim and inflating the tire with water under pressure until the tire bursts by the rupturing of at least one bead ring, noting the pressure of the water which causes such bursting. It is found that the tires of the first series having bead rings not in accordance with the present invention burst at an average water pressure of 15.3 bars, whereas the tires of the second series having bead rings according to the present invention burst at an average water pressure of 16.1 bars, the average water pressure in each series being the arithmetic mean of the water pressures corresponding to the bursting.

The bead rings in accordance with the present invention therefore permit an increase in strength of 5%. One can therefore, for instance, descrease the number of turns in the bead rings of the present invention while having the same strength as the known bead rings. In the example selected this decrease corresponds to one turn per bead ring, namely a length of 1.2 m. This decrease results in a lowering in weigth and a saving in material and energy upon manufacture and therefore a lower cost. In addition to these advantages for tires having bead rings according to the present invention there are the following additional advantages upon travel: Uniform performance as a result of the regular shape of the rings with constant space between the threads and absence of wear of the threads since they are not in direct contact, that is to sy an increase in the life.

It goes without saying that several turns of sheathed threads 10C could be wound simultaneously in the groove 24, for instance, by using several spools 21 at the same time. The method previously described for the manufacture of the bead ring 9 is simple and rapid and it furthermore has the advantage of permitting a large variety of shapes of bead ring by varying the shape of the groove in which the turns of the sheathed thread 10C are wound.

Figure 6:
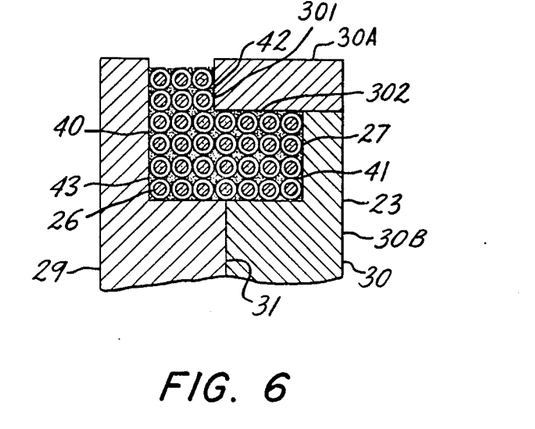

FIG. 6 shows by way of example another groove 40 of the drum 23, FIG. 6 being a section taken in a manner similar to FIG. 5. The complex shape of this groove 40 is without plane of symmetry and comprises a pocket 41 and a neck 42. The winding of turns of sheathed wire 10C in this groove 40 makes it possible to obtain a bead ring 43 whose complex shape can be justified by a complex distribution of the atresse within the pneumatic tire within which this bead ring is contained.

By way of example, the neck 42 is entirely on one side of the plane 31, in the part 29 of the drum 23, and the part 30 of this drum 23 has two removable portions 30A, 30B.

The portion 30A which is radially outward with respect to the axis 0 of the drum 23 has a flat wall 301 parallel to the wall 26 of the part 29, the wall 301 defining the neck 42, and a wall 302 which is a cylinder of revolution with axis 0, this wall 302 definig the pocket 41 and being in contact with the radially inner portion 30B whose wall 27 laterally limits the pocket 41. One starts by removing the portion 30A in order to wind the turns of thread 10C corresponding to the pocket 41 and the portion 30A is then placed back against the portion 30B in order to wind a reduced number of turns of thread 10C so as to produce the neck 42.

Figure 7:
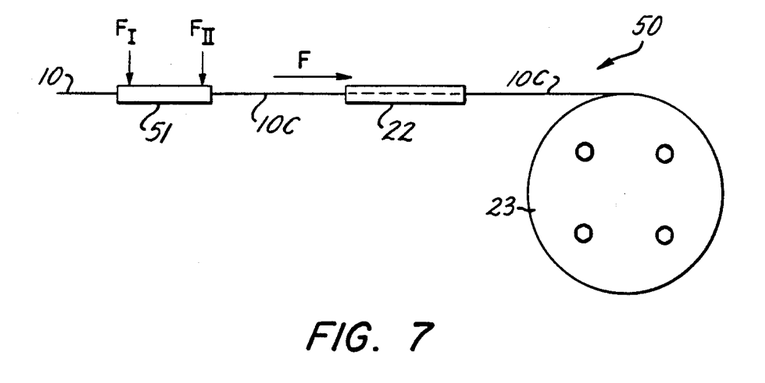
FIG. 7 shows, seen in side view, another device for the production of the bead rings shown in FIG. 3.

FIG. 7 shows another device for the carrying out of the method of the present invention. This device 50 is distinguished from the device 20 previously described by the afct that the double sheathing of the thread 10 with the materials I, II and the production of each bead ring 9 are effected continously. The thread 10 is intruduced into the extrusion head 51 into which the material I is first caused to arrive, this arrival being schematically indicated by the arrow $F_I$, followed by the material II, this arrival being schematically indicated by the arrow $F_{II}$. The sheathed thread emerging from the extrusion head 51 is such that the material II is in liquid or pasty state and the material I in solid state, that is to say it is the sheathed thread 10C. This sheathed thread 10C moves, in the direction of the arrow F, into the heating tunnel 22 in order to maintain the material II in liquid or pasty state, whereupon the sheathed thread 10C is wound on the drum 23, as previously described. It goes without saying that the drum 23 could be arranged directly at the outlet of the extrusion head 51, the device 50 being then without tunnel 22. The continuous sheathing could also be effected only partially, for instance by starting with threads 10A and continuously effecting the sheathing of these threads 10A with the material II and the formation of the bead ring 9.

Each bead ring 9 may, if desired, comprise materials other than the threads 10 and the materials I, II. Thus, for instance, this bead ring 9 can be formed of the assembly 100 and of a rubber jacket arranged around this assembly, the vulcanizing of this jacket tanking place in particular when the bead ring is arranged in the tire 5, so as to facilitate the adherence between the bead ring and the part of the tire with which the ring is in contact.

Figure 8:
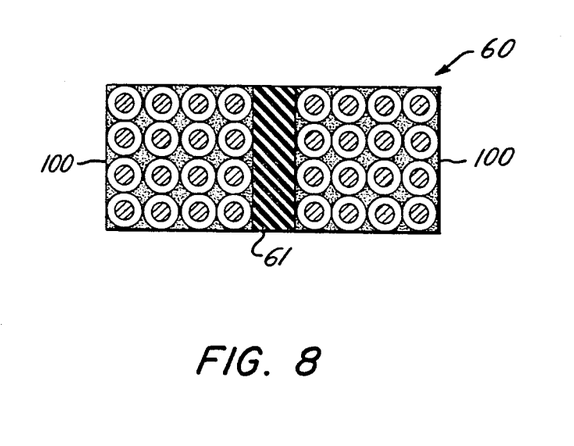
FIG. 8 shows in cross section a complex assembly according to the invention.

The present invention covers cases in which a plurality of assemblies are produced and connected together to form a complex assembly. FIG. 8, for example, shows a section through a complex assembly 60 formed of two assemblies 100 such as previously described which have been connected together by a material 61. This material 61 may be identical or not to the organic material II. Such a complex assembly could be produced also by directly placing two assemblies 100 alongside of each other the contact surfaces of which having been heated so as to cause the material II to melt.

The present invention covers cases in which the assemblies according to the present invention form reinforcement cables or reinforcement plies.

Figure 9:
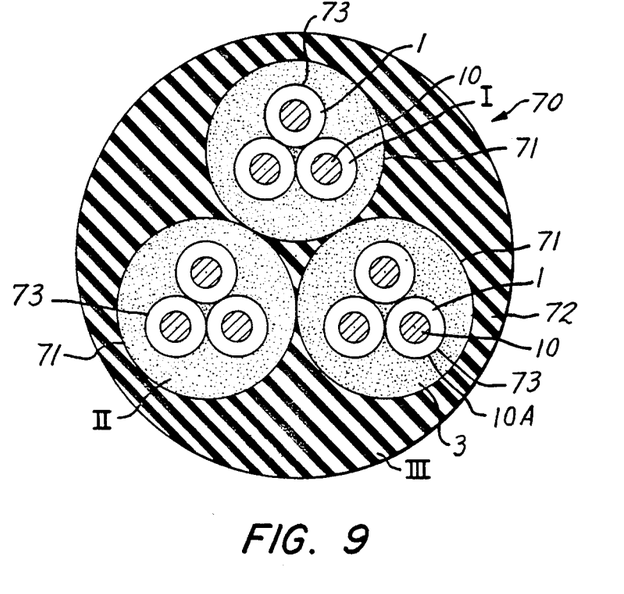
FIG. 9 shows is cross section a cable which is another complex assembly according to the invention.

FIG. 9 shows, for instance, a section through a cable 70 according to the present invention formed of a complex assembly comprising three sheathed strands 71 arranged in an organic solid matrix 72, each of these sheathed strands 71 being an assembly in accordance with the invention. Each sheathed strand 71 is formed, on the one hand, by a strand 73 itself formed of three sheathed threads 10A and, on the other hand, by a solid matrix 3 within which the strand 73 is arranged. Each sheathed thread 10A is formed, as previously described, of a thread 10 surrounded by a solid sheath 1 of material I.

Each sheathed strand 71 is made by the method in accordance with the present invention, for instance in the following manner. First of all, three sheathed threads 10C are produced, each formed, as previously described, of a sheathed thread 10A surrounded by a sheathing 2 of liquid or pasty organic material II. These three shathed threads 10C are then twisted together in order to obtain a strand 73, the material II being still in liquid or pasty state, which makes it possible to fill all the voids between the sheathed threads 10A and to surround these sheathed threads 10A, the sheathings 1 remaining solid. The material II is then solidified in order to obtain the matrix 3 which surrounds the strand 73 the sheathed threads 10A of which are in contact with each other, the matrix 3 filling all the voids between these sheathed threads 10A.

During al the operations described above in which materials I and II are in contact with each other, material II is always at a temperature such that the threads 10 and the material I are solid and suffer practically no degradation.

Figure 10:
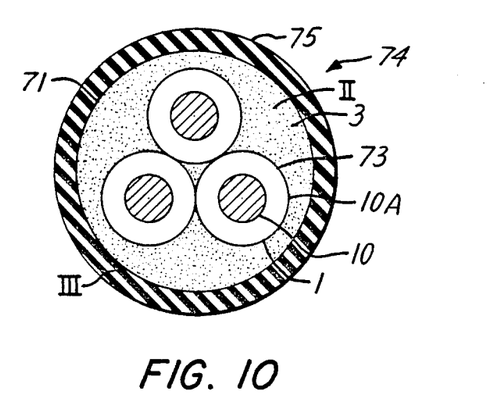
FIG. 10 shows in cross section a double-sheathed strand used for the production of the cable shown in FIG. 9.

Three assemblies 74 are then produced by individually surrounding each sheathed strand 71 with another sheathing 75 of organic material III in liquid or pasty state. Such a double-sheathed strand 74 is shown in cross section in FIG. 10. Three assemblies 74 are then twisted together in order to combine them, the material III being still in liquid or pasty state so as to permit the migration of the material III into all the voids between the sheathed strands 71. The material III is then solidified in order to obtain the solid matrix 72 which surrounds the sheathed strands 71 and fills all the voids between the sheathed strands which are in contact with each other.

During all the operations described above in which each matrix 3 and the material III are in contact with each other, the material III is always at a temperature such that the material I of the sheaths 1 and the material II of the matrices 3 remain solid and undergo practically no degradation. One thus obtains the cable 70 formed of the three sheathed strands 71 and the matrix 72. This cable 70 is such that the reinforcement threads 10 retain a fixed position with respect to the other in each strand 73, due to the sheathings 1 and the matrix 3, and that the strands 73 retain a fixed position with respect to each other due to the matrices 3, 72 without there being any direct contact between the threads 10 due to the sheathings 1, and without there being any void between the threads 10 or between the strands 73. The cable 70 therefore permits uniform performance without wear of the threads 10 by direct contact with each other and without corrosion of these threads 10 when they consist of metal. The material III adheres to the material II and the material I adheres to the threads 10 and to the material II.

This cable 70 can serve, for instance, to reinforce a tube, a strap, a conveyor belt or a pneumatic tire.

The material III can, for instance, be a thermoplastic material or a vulcanizable or curable material, this material III being capable of solidifying at a temperature at which material I and II remain solid.

If the materials I, II and III are all thermoplastic materials one then has the relationship:

$$T_{FI} > T_{FII} \leqq T_{FIII}$$

$T_{FI}$ representing the melting point of material I, $T_{FII}$ representing the melting point of material II and $T_{FIII}$ representing the melting point of material III. One can contemplate further steps employing other matrices of organic materials for instance in order to produce cables each consisting of several cables 70. The use and solidification of each of these materials is then effected at temperatures such that the organic materials of the previous steps remain solid and experience practically no degradation, each of these organic materials adhering to the other organic material or materials with thich it is in contact.

Figure 11:
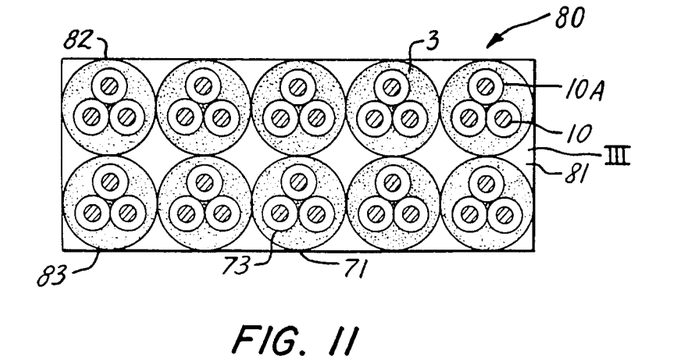
FIG. 11 shows in cross section a reinforcement ply which is another complex assembly in accordance with the invention.

FIG. 11 shows in cross section a reinforcement ply according to the invention. This ply 80 is a complex assembly formed of sheathed strands 71 such as previously described, arranged in a solid organic matrix 81. This ply 80 is, for instance, obtained in a manner similar to the cable 70 previously described, with the difference that the assemblies 74 formed by sheathed strands 71 surrounded by their additional sheathing 75 of material III are arranged in such a manner as to be located in two superimposed layers 82, 83 without the sheathed strands 71 being twisted together. In each layer 82, 83 of the ply 80, all the axes of the strands 73 are parallel to each other and have an orientation different from that of the axes of the strands 73 of the other layer 83, 82, that is to say, these layers are crossed, the sheathed strands 71 being in contact with each other via their sheathings 3 in each layer 82, 83 and from one of these layers to the other. For the sake of the clarity of the drawing, the axes of the strands 73 have not been shown in FIG. 11.

The ply 80 is used, for instance, as reinforcement ply for the crown 6 of the tire 5 shown in FIG. 3, the sheathed strands 71 being represented by circles in this figure. The material III is, for instance, an unvulcanized rubber the vulcanization of which is brought about within the tire 5 so as to obatin the matrix 81. The advantages of the ply 80 are similar to those previously described for the cable 70, that is to say, in particular, the threads 10 reimain separate from each other at a fixed distance apart in each strand 73, without the risk of wear by rubbing and without risk of corrosion when the threads 10 are of metal, with uniform performance for all these strands 73.

In the method of the present invention it is necessary that each thread 10 be convered individually by a sheathing of organic material 1 so as to obtain a sheathed thread 10A in order to assure a give minimum distance between the adjacent threads 10, but the matrices in which these sheathed threads 10A are arranged can be made by simultaneously sheathing together a plurality of sheathed threads 10A or several assemblies of sheathed threads 10A. Thus, for instance, the matrix 3 of the assembleis 100, 71 can be made by surrounding several sheathed threads 10A or all sheathed threads 10A of each of these assemblies with same common sheathing of material II.

However, it is preferable to sheathe each sheathed thread 10A or each assembly according to the present invention of these sheathed threads individually with the matrix-forming material as described in the examples or to sheathe individually at least a part of these threads or of these assemblies, in order to permit, in each case, a good migration of the material of these sheathings into all the void, and this particularly because the sheathed threads 10A or the assemblies of these sheathed threads contact each other since the voids between the sheathed threads or between these assemblies are then in the form of channels which are difficultly accessible for the matrix-forming material.

It should be noted, furthermore, that the threads sheathed with materials I and II can easily be stored, for instance, on spools, the sheathings being then in particular solid. It is then sufficient to effect the grouping of these threads, the material II being in liquid or pasty state, so as to permit the production of an assembly in accordance with the present invention. Similarly, it is possible to store an assembly according to the present invention, for instance the assembly 74 having a solid sheathing 75 and to produce a complex assembly, for instance the cable 70, by grouping these assemblies 74, the material III being in liquid or pasty state.

The passage into liquid or pasty state of the material II, for instance its fusion, can be caused after the grouping of the sheathed threads, in particular by heating a bundle of threads sheathed with solid materials I and II, this heating being effected, for instance, with the use of the reinforcement threads themselves, in particular by passing an electric current through them, but it is preferable that the material II be in liquid or pasty state before the threads sheathed with materials I and II are grouped together for reasons of a saving of energy, speed of manufacture and facilitation of the migration of the material II.

The sheathing of the reinforcement threads with the materials I and II can be effected by methods other than extrusion, for instance by dipping or by spraying.

It should also be noted that the reinforcement threads may be subjected to threatment before being covered by the sheathing of material I, for instance a sizing threatment in order to improve the adherence between the thread and the organic material.

The above remarks concerning the sheathing and the production of the matrix of the assemblies in accordance with the present invention apply to the complex assemblies in accordance with the present invention.

Of cource, the present invention is not limited to the embodiments which have been described above.

What is claimed is:

1. A method of obtaining an assembly intended to reinforce a pneumatic tire, the assembly having reinforcement threads and a solid matrix in which these threads are arranged, the method being characterized by the following features:
   (a) reinforcement threads surrounded individually by a sheathing of organic material I and furthermore surrounded individually by another sheathing of organic material II are grouped together;
   (b) material II is caused to migrate into voids between the threads sheathed with material I so as to fill the voids with the material II which is then in liquid or pasty state, the threads sheathed with material I being grouped in such a manner that the sheathings of material I of two adjacent reinforcement threads are in contact with each other at the end of the migration of the material II;
   (c) the materials I and II are thermoplastic materials such that the melting point of material I is higher than the melting point of material II, the temperature of material II upon the migration of the material II being greater than the melting point of the material II and less than the melting point of material I;
   (d) the material II is caused to solidify, it thus constituting the solid matrix in which the threads sheathed with material I are arranged;
   (e) during the migration and the solidification of the material II, the threads and their sheathings of material I remain solid; and
   (f) material I adheres to the threads which it surrounds and to the matrix with which it is in contact.

2. A method according to claim 1, characterized by the fact that the material II is in liquid or pasty state at the time that the reiforcement threads are group together.

3. A method according to claim 1, characterized by the fact that the grouping of the reinforcement threads is effected at least in part by winding turns of a thread.

4. A method according to claim 4, characterized by the fact that the turns are wound in a groove of a drum.

5. A method according to claim 1, characterized by the fact that the materials I and II are formed at least in part of polyamides.

6. A method according to claim 5, characterized by the fact that material I is formed at least in part of a polyamide 66 and material II is formed at least in part of a polyamide 6.

7. A method according to claim 1, cahracterized by the fact that the ratio between the extension modulus of each reinforcement thread and the compression modulus of material I is at least equal to 1 and at most equal to 300, these moduli being determined at 20° C.

8. A method according to claim 1, characterized by the fact that the materials I and II haveе substantially the same compression modulus, determined at 20° C.

9. A method according to claim 1, characterized by the fact that the at least partial sheathing of the reinforcement threads and their grouping together are effected continuously.

10. A method of obatining a complex assembly intended to reinforce an article, characterized by the fact that at least two assemblies obtained by the method according to claim 1 are connected together.

11. A method according to claim 10 characterized by the fact that the assemblies are surrounded by another sheathing of organic material III, by the fact that the material III is caused to migrate into voids between the assemblies so as to fill the voids with the material III which is then in liquid or pasty state, and by the fact that the material III is caused to solidify, it thus contituting a matrix in which the assemblies are arranged, the sheathings of material I, the matrices of material II and the reinforcement threads of these assemblies remaining solid during these operations.

12. A method according to claim 11, characterized by the fact that, in the case of at least part of the assemblies, the sheathing of material III is produced individually on each these assemblies and by the fact that these assembles individually sheathed with material III are then grouped together to cause the migration of the material III in liquid or pasty state into the voids between the assemblies.

* * * * *

UNITED STATES PATENT AND TRADEMARK OFFICE
CERTIFICATE OF CORRECTION

PATENT NO. : 4,857,128                                Page 1 of 3

DATED     : August 15, 1989

INVENTOR(S) : Bocquet et al.

It is certified that error appears in the above-identified patent and that said Letters Patent is hereby corrected as shown below:

First page, first line of Item 73, "Compangnie" should read --Compagnie--;

Col. 1, line 26, "treads" should read --threads--;

Col. 2, line 7, "sheathing" should read --sheathings--;

Col. 2, line 51, "shows is" should read --shows in--;

Col. 6, line 43, after "with" insert --the--;

Col. 6, line 45, after "this" insert --wire--;

Col. 7, line 34, "descrease" should read --decrease--;

Col. 7, line 39, "weigth" should read --weight--;

Col. 7, line 47, "sy" should read --say--;

Col. 7, line 65, "atresse" should read --stresses--;

Col. 8, line 7, "definig" should read --defining--;

UNITED STATES PATENT AND TRADEMARK OFFICE
CERTIFICATE OF CORRECTION

PATENT NO. : 4,857,128

DATED : August 15, 1989

INVENTOR(S) : Bocquet et al.

It is certified that error appears in the above-identified patent and that said Letters Patent is hereby corrected as shown below:

Col. 8, line 18, "afct" should read --fact--;

Col. 8, lines 20-21, "intruduced" should read --introduced--;

Col. 8, line 44, "tanking" should read --taking--;

Col. 9, line 11, "Thse" should read --These--;

Col. 9, line 12, "shathed" should read --sheathed--;

Col. 10, line 1, "$T_{FI} > T_{FII} \leq T_{FIII}$" should read --$T_{FI} > T_{FII} > T_{FIII}$--;

Col. 10, line 14, "thich" should read --which--;

Col. 10, line 49, "convered" should read --covered--;

Col. 10, line 51, "give" should read --given--;

Col. 11, line 34, "threatment" should read --treatment--;

Col. 11, line 36, "threatment" should read --treatment--;

UNITED STATES PATENT AND TRADEMARK OFFICE
CERTIFICATE OF CORRECTION

PATENT NO. : 4,857,128
DATED : August 15, 1989
INVENTOR(S) : Bocquet et al.

It is certified that error appears in the above-identified patent and that said Letters Patent is hereby corrected as shown below:

Col. 11, line 42, "cource" should read --course--;

Col. 12, line 15, "reiforcement threads are group" should read --reinforcement threads are grouped--;

Col. 12, line 20, "claim 4" should read --claim 3--;

Col. 12, line 29, "cahracterized" should read --characterized--;

Col. 12, line 35, "havee" should read --have--;

Col. 12, line 41, "obatining" should read --obtaining--;

Col. 12, line 51, "contituting" should read --constituting--;

Signed and Sealed this

Seventh Day of August, 1990

*Attest:*

HARRY F. MANBECK, JR.

*Attesting Officer*  *Commissioner of Patents and Trademarks*